Patented Feb. 2, 1943

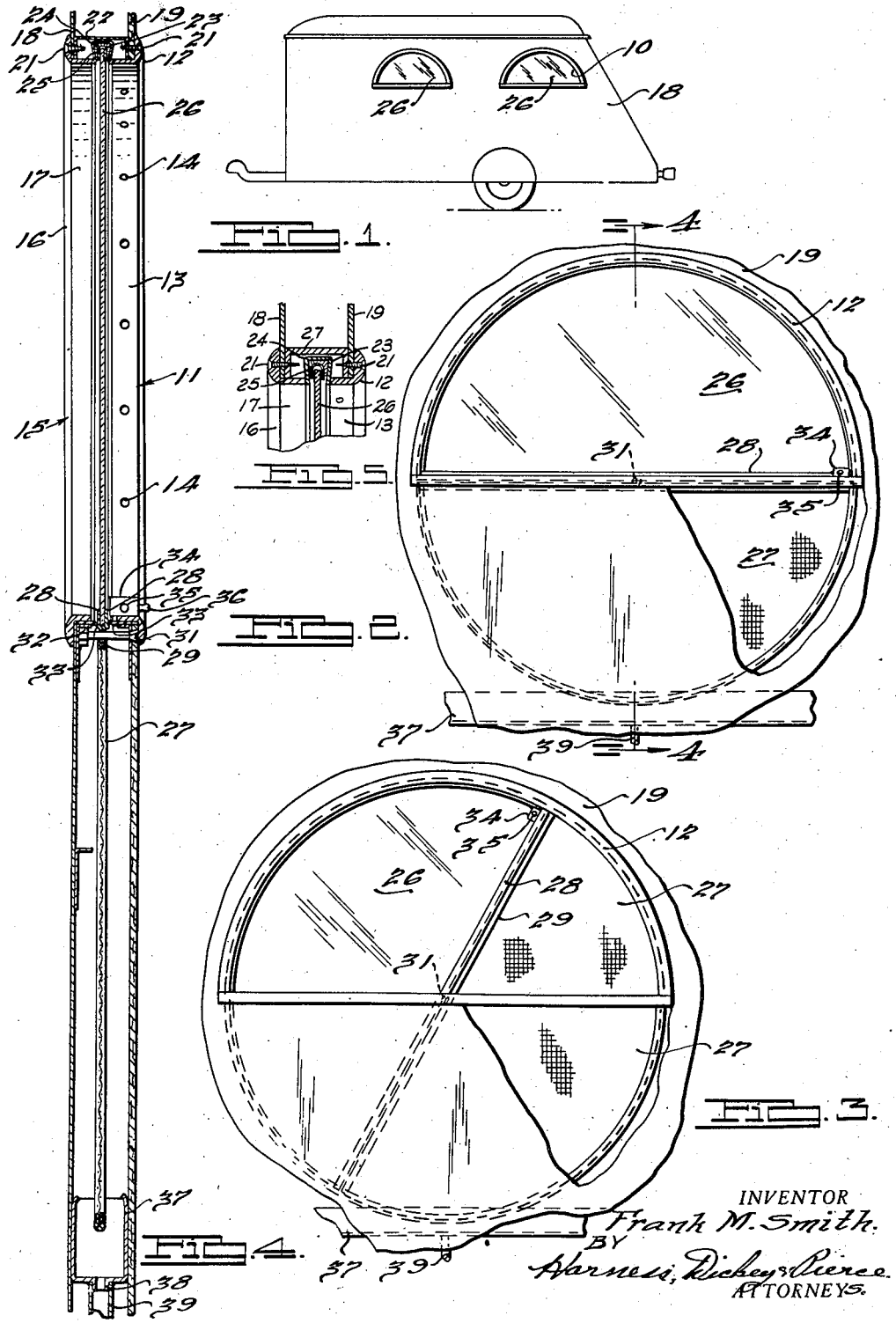

2,310,127

UNITED STATES PATENT OFFICE 2,310,127

SEMICIRCULAR WINDOW AND SCREEN

Frank M. Smith, Dearborn, Mich., assignor to Stout Engineering Laboratories, Inc., Dearborn, Mich., a corporation of Michigan Application August 7, 1940, Serial No. 351,752

4 Claims. (Cl. 160—19)

My invention relates to windows, and particularly to a window having an opening of semicircular shape, with a circular frame containing a semi-circular window and screen all or a portion of each of which may cover said opening.

While window and screen combinations have been employed heretofore for an opening, I have combined in my present invention the screen and window to form a circle pivoted at its center adjacent to a semi-circular opening which is closed by the window or screen or by a portion of each. The combination window and screen may be employed in automotive vehicles such as trailers, busses, aeroplanes, passenger train coaches, boats and the like and may also be utilized in buildings, more particularly in the modern type of homes.

The semi-circular opening is preferably provided with reveal and trim molding on the exterior and interior walls, respectively, having therebetween a guide run channel in which the marginal edge of the window and screen is movable. At the interior and exterior ledge of the opening a sealing strip is provided for sealing the lower edge of the window against the passage of water. A trough is provided below the window for collecting any moisture which might pass between the exterior ledge and the sealing strip where it may collect and be conducted through a tubular element to the ground.

Accordingly, the main objects of my invention are; to provide a semi-circular window opening with a circular closure half of which is transparent and the other half of which is a screen; to define a semi-spherical opening with an inner and outer molding having therebetween a guide channel for a circular frame half of which supports a window, the other half of which supports screening material; to provide a semi-circular window having a ledge containing a sealing strip with a trough for collecting the moisture which may pass by the sealing strip; to pivot adjacent to the ledge of a semi-spherical opening a circular closure half of which is enclosed by a window, the other half of which is enclosed by screening material; and in general, to provide a circular frame enclosed with transparent and screening materials for a semi-circular opening, which is simple in construction, which is adjustable to various positions, and which is economical of manufacture.

Other objects and features of novelty of my invention will be either specifically pointed out or will become apparent when referring, for a better understanding of my invention, to the following description taken in conjunction with the accompanying drawing, wherein:

Figure 1 is a side view in elevation of a trailer having windows therein embodying features of my invention;

Fig. 2 is an enlarged broken interior view of one of the windows illustrated in Fig. 1;

Fig. 3 is a view of the structure illustrated in Fig. 2 with the window in partly open position;

Fig. 4 is an enlarged sectional view of the structure illustrated in Fig. 2, taken on the line 4—4 thereof; and Figure 5 is an enlarged, fragmentary, sectional view showing the portion of the structure shown in Figure 4 on a considerably larger scale for the sake of clarity.

While I have illustrated in Fig. 1 a trailer equipped with the window embodied in my invention, it is to be understood that the trailer is shown more by way of example rather than of limitation, since it is to be understood that the particular window construction may be applied not only to mobile equipment such as trailers, automobiles, boats, train coaches and the like, but also to fixed structures such as buildings.

The window embodies an opening 10 of semicircular construction, having a garnish molding 11 comprising an inner trim flange 12 and a flange 13 projecting into the opening. This flange is preferably provided with a plurality of apertures 14 for a purpose hereinafter to be described. The outer reveal portion is likewise formed by an angle shaped molding 15 having an outer trim flange portion 16 and an inwardly projecting flanged portion 17 disposed in the plane of the flange 13. The moldings are attached by the flanges 12 and 16 to the outer panel 18 and to the inner panel 19 by screws 21. Semi-circular channel shaped bracing elements 22 join the two panels adjacent to the opening.

A channel shaped window guiding element 23 of semi-circular shape, joins the edges of the flanges 13 and 17. Suitable sealing material 24 is disposed in the channel element 23 against which the frame 25, supporting the semi-circular window glass 26, engages. The frame 25 is circular in shape, the semi-circular portion below the window glass 26 being crimped to the end of a semi-circular screen 27. Across the diameter of the frame 25, at the junction between the screen and the window, a pair of strips 28 are mounted formed at one end into a channel to engage the edge of the window glass 26 and extended therebelow at 29 and joined to the diametrical edge of the screen 27.

A bolt 31 extends through the projection 29 to form a pivot at the center of the circular frame 25. Along the ledge 32 of the opening, sealing strips 33 are disposed having a lip projecting into engagement with the window glass 26. A casing 34 is mounted on the inner element 28 provided with a spring-pressed plunger 35 having an extension 36 projecting from the casing by which the plunger is operated. The plunger 28 is aligned with the apertures 14 in the flange 13 with which it engages, and employed for latching the window in open or closed positions as illustrated in Figs. 2 and 3.

Below the circular frame 25, I have provided a trough 37 for the purpose of catching any water which may drip past the sealing elements 33. The trough is provided with a flanged opening 38 having a conduit 39 welded or otherwise secured thereto for conducting the water collected in the trough 37 away from the space between the inner and outer panels 18 and 19.

It will thus be seen that I have provided a circular frame, half of which is enclosed by a window, the other half of which is enclosed by a screen. The frame is mounted on a pivot centrally disposed to a semi-circular window opening. Suitable framing is provided about the opening, one flange of which has a plurality of apertures selectively engageable by a plunger carried by the circular frame. By means of the plunger and the apertures the circular frame may be locked in position with the opening enclosed by the window or by the screen, or partially by the window and screen as desired. Sealing means are provided along the ledge of the opening and a trough is provided therebelow to collect any of the water which may be drained by the sealing means. While the window is useful on trailers, boats and the like, because it eliminates the projection of the window outwardly of the side wall, it is to be understood that the window has many other applications such as for passenger cars, homes, and the like, as mentioned hereinabove.

While I have described and illustrated but a single embodiment of my invention, it will be apparent to those skilled in the art that various changes, omissions, additions and substitutions may be made therein without departing from the spirit and scope of my invention, as set forth in the accompanying claims.

What I claim is:

1. A closure for a semi-circular window embodying a circular frame of inwardly presenting channel section having a diametrically disposed channel element with projecting flanges, a semi-circular window glass in one portion of said frame, a semi-circular screen in the other portion of said frame, said glass and screen being retained in aligned relation by said channel, a pivot projecting through said channel element centrally of said frame and supported centrally of said semi-circular opening, finish elements at the inner and outer marginal edges of said opening having inwardly directed flanges disposed in alignment, and a semi-circular channel guide element joining said flanges and encompassing the edge of said frame.

2. The combination in a window having a semi-circular opening, a closure for said opening embodying a circular frame of inwardly presenting channel section, a pivot disposed centrally of said frame and on the center of the arc of said opening, a window in one half of said frame, a screen in the other half of said frame, said window and screen being secured in aligned relation by said channel section, semi-circular angle shaped elements on the inner and outer sides of the opening with the flanges thereof in aligned spaced relation, and a channel shaped element encompassing the frame and secured to said flanges.

3. The combination in a window having a semi-circular opening, a closure for said opening embodying a circular frame of inwardly presenting channel section, a pivot disposed centrally of said frame and on the center of the arc of said opening, a window in one half of said frame, a screen in the other half of said frame, said window and screen being secured in aligned relation by said channel section, semi-circular angle shaped elements on the inner and outer sides of the opening with the flanges thereof in aligned spaced relation, a channel shaped element encompassing the frame and secured to said flanges, a ledge on the inner and outer side of said window at the diametrical portion thereof, and sealing means on said ledge engageable with said window and screen.

4. The combination in a window having a semi-circular opening, a closure for said opening embodying a circular frame of inwardly presenting channel section, a pivot disposed centrally of said frame and on the center of the arc of said opening, a window in one half of said frame, a screen in the other half of said frame, said window and screen being secured in aligned relation by said channel section, semi-circular angle shaped elements on the inner and outer sides of the opening with the flanges thereof in aligned spaced relation, a channel shaped element encompassing the frame and secured to said flanges, a ledge on the inner and outer side of said window at the diametrical portion thereof, sealing means on said ledge engageable with said window and screen, and a trough below said window frame having an outlet conduit for conducting moisture therefrom which may collect from said window.

FRANK M. SMITH.